(12) United States Patent
Yu et al.

(10) Patent No.: US 11,146,928 B2
(45) Date of Patent: Oct. 12, 2021

(54) VEHICULAR COMMUNICATION OF ROAD TRAFFIC STATUS

(71) Applicant: Nokia Solutions and Networks Oy, Espoo (FI)

(72) Inventors: Ling Yu, Kauniainen (FI); Vinh Van Phan, Oulu (FI); Ilkka Antero Keskitalo, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 594 days.

(21) Appl. No.: 16/074,125

(22) PCT Filed: Feb. 4, 2016

(86) PCT No.: PCT/EP2016/052323
§ 371 (c)(1),
(2) Date: Jul. 31, 2018

(87) PCT Pub. No.: WO2017/133769
PCT Pub. Date: Aug. 10, 2017

(65) Prior Publication Data
US 2021/0125490 A1    Apr. 29, 2021

(51) Int. Cl.
*H04W 4/44* (2018.01)
*G08G 1/01* (2006.01)
(Continued)

(52) U.S. Cl.
CPC ............. *H04W 4/44* (2018.02); *G08G 1/012* (2013.01); *G08G 1/0116* (2013.01);
(Continued)

(58) Field of Classification Search
CPC .... G08G 1/0116; G08G 1/012; G08G 1/0133; G08G 1/162; H04W 88/10; H04W 4/44
See application file for complete search history.

(56) References Cited

U.S. PATENT DOCUMENTS 9,338,237 B2 *   5/2016  Sakata ................. H04W 4/021
2010/0332121 A1 * 12/2010  Okude .............. G01C 21/3415
                                                              701/533
(Continued)

FOREIGN PATENT DOCUMENTS

WO   WO 2010/129072 A1   11/2010
WO   WO 2016/141980 A1    9/2015
(Continued)

OTHER PUBLICATIONS

3GPP TSG-RAN WG1 Meeting #82bis, Malmo, Sweden, Oct. 5-9, 2015, R1-155934, "Discussion on eNB-UE link and RSU modeling for V2X", Nokia Networks, 3 pgs.
(Continued)

*Primary Examiner* — Mohamed Barakat
(74) *Attorney, Agent, or Firm* — Harrington & Smith

(57) ABSTRACT

A network apparatus, such as a road side unit, measures signalling transmitted from vehicle devices, to obtain the status of road traffic in the proximity of the road side unit. If a pre-defined triggering event is detected in the status of the road traffic in the proximity of the road side unit, the road side unit transmits to a serving network node, a status report in order to report the obtained road traffic status to the serving network node. The road side unit receives, from the serving network node, control signalling indicating at least one road side unit operation mode selected for communication, and sets the operation mode of the road side unit to correspond to the at least one selected road side unit operation mode for the communication.

20 Claims, 5 Drawing Sheets

(51) Int. Cl.
    *G08G 1/16* (2006.01)
    *H04W 88/10* (2009.01)
(52) U.S. Cl.
    CPC ........... *G08G 1/0133* (2013.01); *G08G 1/162* (2013.01); *H04W 88/10* (2013.01)

(56) References Cited

U.S. PATENT DOCUMENTS

| | | | |
|---|---|---|---|
| 2013/0154853 A1 | 6/2013 | Chen | 340/905 |
| 2015/0195827 A1* | 7/2015 | Feng | H04L 63/0428 380/270 |
| 2015/0326668 A1* | 11/2015 | Mader | H04W 4/44 455/404.1 |
| 2016/0242223 A1* | 8/2016 | Brahmi | H04W 76/16 |

FOREIGN PATENT DOCUMENTS

| | | |
|---|---|---|
| WO | WO 2016/141983 A1 | 9/2016 |
| WO | WO 2016/173612 A1 | 11/2016 |

OTHER PUBLICATIONS

3GPP TSG-RAN WG2 Meeting #91bis, Malmo, Sweden, Oct. 5-9, 2015, R2-154147, "Considerations of V2X Implications to RAN Operation", Nokia Networks, 7 pgs.

* cited by examiner

VEHICULAR COMMUNICATION OF ROAD TRAFFIC STATUS

This patent application is a U.S. National Stage application of International Patent Application Number PCT/EP2016/052323 filed Feb. 4, 2016, which is hereby incorporated by reference in its entirety.

TECHNICAL FIELD

The present invention relates to communications.

BACKGROUND

Vehicular communication systems refer to networks in which vehicles and roadside units (RSU) represent the communicating nodes, providing each other with information on safety warnings and traffic congestion, for example. Deploying local warning systems through vehicular communications enables eliminating the excessive cost of traffic collisions. Vehicle-to-vehicle (V2V) technology refers to an automobile technology that allows vehicles to communicate with each other. V2V may also be referred to as a vehicular ad hoc network (VANET). The vehicular ad hoc networks may be formed by cars, and used for a variety of applications including safety, navigation, and law enforcement.

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following, the invention will be described in greater detail by means of preferred embodiments with reference to the accompanying drawings, in which.

DETAILED DESCRIPTION OF SOME EMBODIMENTS

Figure 1:
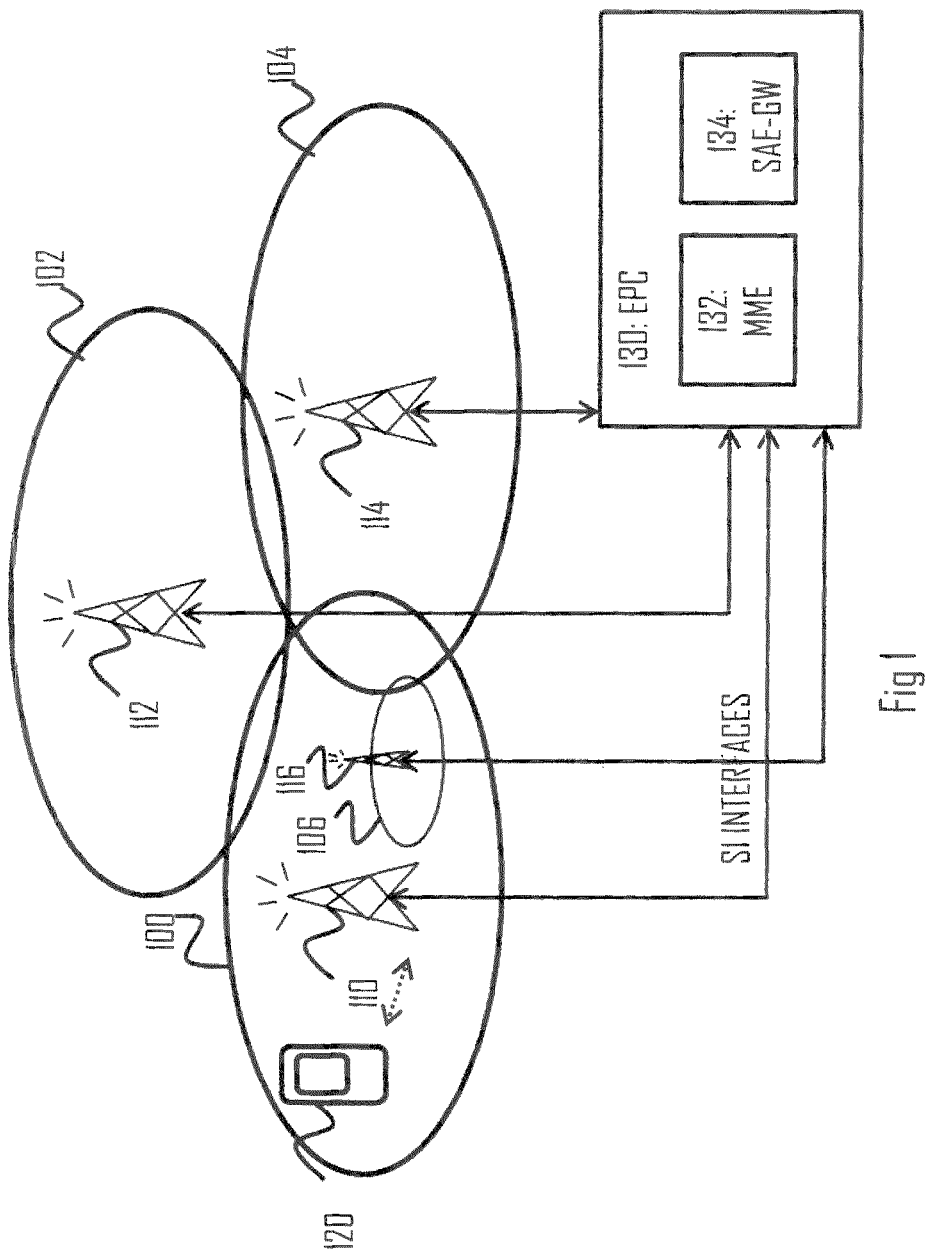
FIG. 1 illustrates a wireless communication system to which embodiments of the invention may be applied.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Further-more, words "comprising" and "including" should be understood as not limiting the described embodiments to consist of only those features that have been mentioned and such embodiments may contain also features/structures that have not been specifically mentioned.

Embodiments described may be implemented in a radio system, such as in at least one of the following: universal mobile telecommunication system (UMTS, 3G) based on basic wideband-code division multiple access (W-CDMA), high-speed packet access (HSPA), long term evolution (LTE), LTE-advanced, and/or 5G system. The present embodiments are not, however, limited to these systems.

The embodiments are not, however, restricted to the system given as an example but a person skilled in the art may apply the solution to other communication systems provided with necessary properties. One example of a suitable communications system is the 5G system, as listed above. It is assumed that network architecture in 5G will be quite similar to that of the LTE-advanced. 5G is likely to use multiple input multiple output (MIMO) antennas, many more base stations or nodes than the current network deployments of LTE (a so-called small cell concept), including macro sites operating in co-operation with smaller local area access nodes and perhaps also employing a variety of radio technologies for better coverage and enhanced data rates. 5G will likely be comprised of more than one radio access technology (RAT), each optimized for certain use cases and/or spectrum.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or cloud data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent. Some other technology advancements probably to be used are software-defined networking (SDN), big data, and all-IP, which may change the way networks are being constructed and managed.

FIG. 1 illustrates an example of a cellular communication system to which embodiments of the invention may be applied. Cellular radio communication networks, such as the long term evolution (LTE), the LTE-advanced (LTE-A) of the 3rd generation partnership project (3GPP), or the predicted future 5G solutions, are typically composed of at least one network element, such as a network element 110, providing a cell 100. Each cell may be, e.g. a macro cell, a micro cell, femto, or a pico cell, for example. The network element 110 may be an evolved node-B (eNB) as in the LTE and LTE-A, or any other apparatus capable of controlling radio communication and managing radio resources within a cell. For 5G solutions, the implementation may be similar to LTE-A, as described above. The network element 110 may be called a base station or an access node. The cellular communication system may be composed of a radio access network of network elements 110, 112, 114, e.g. eNBs, each controlling a respective cell or cells 100, 102, 104. The network elements 110 to 114 may each control a macro cell 100 to 104 providing wide area coverage for terminal devices 120. The network elements 110 to 114 may also be called access nodes because they provide the terminal devices 120 with wireless access to other networks such as the internet. Additionally, one or more local area access nodes 116 may be arranged within a control area of a network element 110, 112, 114 controlling a macro cell, 100 to 104. The local area access node 116 may provide wireless access within a sub-cell 106 that may be comprised within a macro cell 100. Examples of the sub-cell may include a micro, pico and/or femto cell. Typically, the sub-cell provides a hot spot within a macro cell. The operation of the local area access node 116 may be controlled by a network element 110 under whose control area the sub-cell is provided. The network element 110 and the other network elements 112 to 116 may support dual connectivity (DC) in which the terminal device 120 has established multiple connections with cells associated with a master eNB network element and a secondary eNB network element.

The network element 110 may employ carrier aggregation in which the terminal device 112 is allocated with resources from a plurality of component carriers that may be on contiguous frequency bands or on non-contiguous frequency bands. One network element 110 may provide one component carrier, e.g. a primary component carrier, while another network element 116 may provide another component carrier, e.g. a secondary component carrier. The network element 110 operating the primary component carrier may carry out scheduling of resources on all component carriers, or each network element 110, 116 may control scheduling of the component carrier it operates. Alternatively network element 110 may provide one component carrier, e.g. a primary component carrier, as well as another component carrier, e.g. a secondary component carrier.

In the case of multiple eNBs in the communication network, eNBs may be connected to each other with an X2 interface as specified in LTE. Other communication methods between the network elements may also be possible. The network elements 110 to 116 may be further connected via an S1 interface to an evolved packet core (EPC) 130, more specifically to a mobility management entity (MME) 132 and to a system architecture evolution gateway (SAE-GW) 134 as in LTE and LTE-A.

The radio system of FIG. 1 may support machine type communication (MTC). MTC may enable providing service for a large amount of MTC capable devices, such as the at least one terminal device 120. The at least one terminal device 120 may comprise mobile phones, smart phones, tablet computers, laptops and other devices used for user communication with the radio communication network, such as a MTC network. These devices may provide further functionality compared to the MTC scheme, such as communication link for voice, video and/or data transfer. However, in MTC perspective the at least one terminal device 120 may be understood as a MTC device. The at least one terminal device 120 may also comprise another MTC capable device, such as a sensor device providing position, acceleration and/or temperature information to name a few examples.

Special roadside devices or roadside units (RSU) may be deployed along a road as mounted e.g. on roadside lamp posts for supporting V2X (vehicle-to-X, vehicle-to-everything) communications. The roadside unit RSU may be of UE-type and/or eNB-type. Specifically, RSU may be a special direct D2D-capable UE-type device, or a combination of a local eNB and the special UE-type device, for providing cellular access coverage.

Each RSU type and its associated operation mode may be required for particular use case scenarios, applications or traffic patterns of V2X communications, in terms of fulfilling service requirements as well as deployment and operation KPIs of interest, including cost, energy efficiency and robustness. For example, main automobile roads in big cities like Los Angeles, Beijing or Sydney, are often 2-way roads with 4 lanes per each direction and have expected travelling speed of 60-90 km/h. In normal road traffic situations, cars are expected to travel with speeds of around 80 km/h and keep an inter-car distance on the same lane at around 80 m persistently. At rush hours, cars may have to travel with speeds of less than 10 km/h and keep the inter-car distance on the same lane at less than 10 m. That is, during rush-hour traffic or congestion, a 10-fold increase in car density on the main roads may be experienced. It is not unusual in the big cities like Los Angeles, Beijing or Sydney, that people may be stuck in the road traffic for hours on a daily basis, and may need a network access to work or entertainment. Therefore, it is desirable that support of V2X communications, including V2V, V2I, V2N and regular cellular network access as part of V2I for people sitting in cars, is able to cope with such highly time-varying and dynamic traffic scenarios in an efficient way.

In traffic situations where cars are able to travel fast on the road, connectionless radio access for V2V may be provided by using direct D2D communications with possible aids of the UE-type RSUs to avoid the need of excessive mobility management for V2V, whereas connection-oriented network access for V2I may be provided by robust macro-cell coverage sufficiently and efficiently enough. In the rush-hour traffic or congestion, the increased user density on the road and the V2X communication traffic demand thereof, may utilize the eNB-type RSUs for providing the required boost in the network capacity (higher multiplexing gain for V2V and enhanced small-cell service coverage for V2I).

Vehicle-to-infrastructure (V2I) communications refers to wireless exchange of critical safety and operational data between vehicles and roadway infrastructure, intended primarily to avoid motor vehicle crashes.

Vehicle-to-X (V2X) refers to an intelligent transport communications system where the vehicles and infrastructure systems are interconnected with each other. V2I also includes V2N (vehicular-to-network) where V2I may be a connection to an infrastructure node, including the road side unit (RSU), or a connection to a server via an LTE Uu connection.

Figure 2:
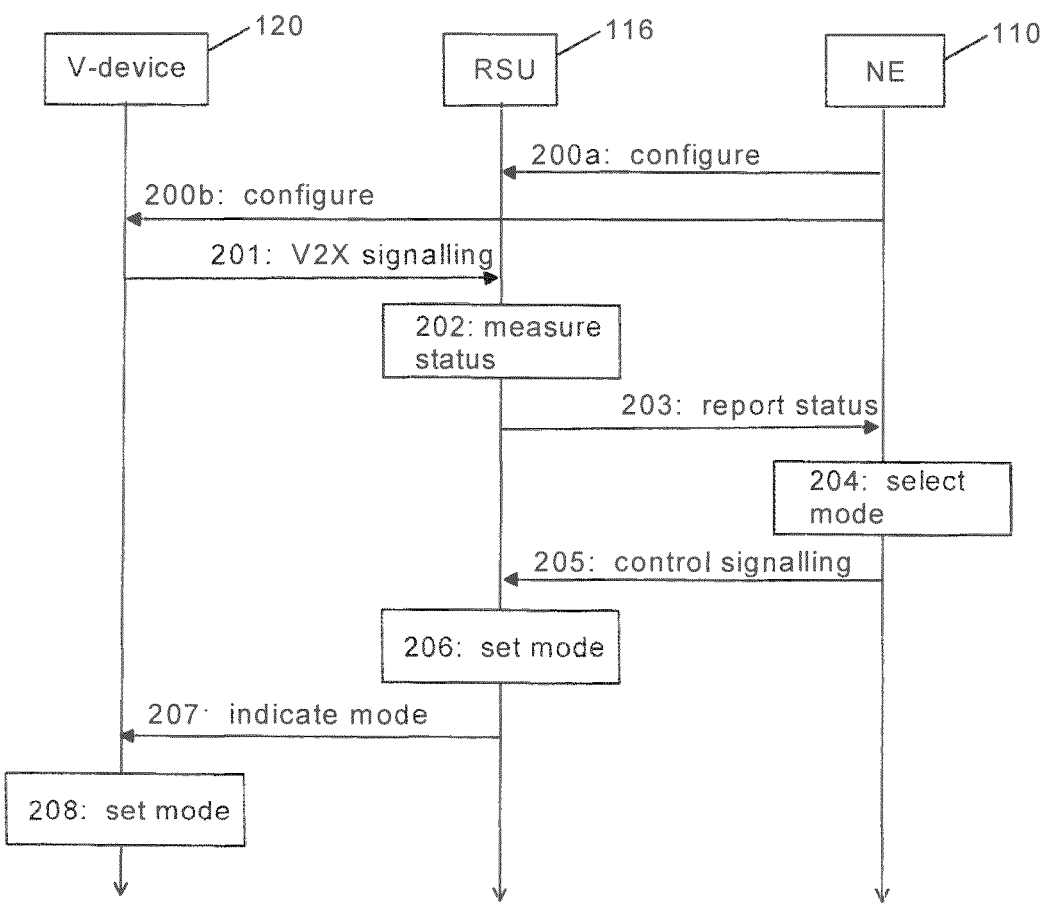
FIGS. 2 and 3 illustrate signalling diagrams of a procedure for selecting an RSU operation mode according to an embodiment of the invention.
Figure 3:
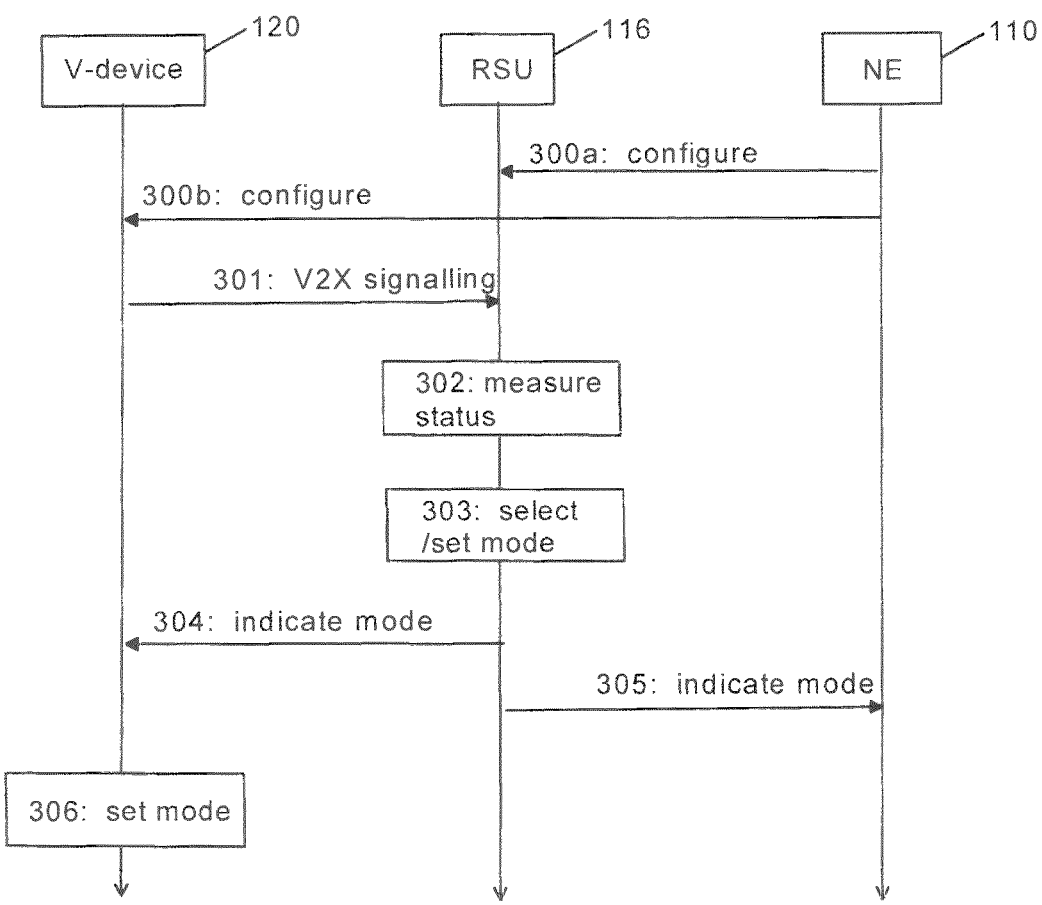

Let us now describe an embodiment of the invention for network function virtualization with reference to FIGS. 2 and 3. FIGS. 2 and 3 illustrate signalling diagrams illustrating methods for selecting and signalling RSU operation mode parameters between a terminal device of a cellular communication system, e.g. vehicle device 120, and a base station of the cellular communication system, e.g. road side unit 116 or serving macro cell base station 110.

Referring to FIG. 2, a serving network node, such as the serving macro cell base station 110 (NE), may configure (block 200a) network apparatuses, such as the road side unit 116, to measure and report designated V2X-related traffic statuses to the serving network node 110, individually and/or cooperatively. The serving network node 110 may also transmit (block 200b) designated V2X-related measuring and reporting configuration information to terminal devices, such as the vehicle device 120 (V-device). The vehicle devices 120 transmit (block 201) V2X signalling via wireless communications. The road side unit 116, measures (block 202) V2X signalling transmitted from the vehicle devices 120, and, based on the measuring 202 obtains (block 202) the status of road traffic in the proximity of the road side unit 116. If a pre-defined triggering event is detected (block 202) in the status of the road traffic in the proximity of the road side unit 116, the road side unit 116 transmits (block 203) to the serving macro cell base station 110, a status report in order to report the obtained road traffic status to the serving network node 110. The serving network node 110 receives (block 204) the status report from the road side unit, and based on the receiving 204, selects (block 204) at least one road side unit operation mode for V2X communication. The serving network node 110 may further use e.g. cellular access network load experienced in the serving network node as a basis for selecting the road side unit operation mode. The serving network node 110 may transmit (block 205), to the road side unit 116, control signalling indicating the at least one selected road side unit operation mode for the V2X communication. The road side unit 116 may receive (block 206), from the serving network node 110, the control signalling indicating the at least one selected road side unit operation mode for the V2X communication, and based on the receiving 206, sets (block 206) the operation mode of the road side unit 116 to correspond to the at least one selected road side unit operation mode. The road side unit 116 may transmit (block 207) to the vehicle device 120 via a wireless communication link, control signalling indicating the at least one selected road side unit operation mode for the V2X communication. The vehicle device 120 may receive (block 208), via the wireless communication link, the control signalling indicating the at least one selected road side unit operation mode for the V2X communication, and, based on the receiving 208, use (block 208) the at least one selected operation mode for the V2X communication.

Referring to FIG. 3, a serving network node, such as the serving macro cell base station 110 (NE), may configure (block 300a) network apparatuses, such as the road side unit 116, to measure and report designated V2X-related traffic statuses to the serving network node 110, individually and/or cooperatively. The serving network node 110 may also transmit (block 300b) designated V2X-related measuring and reporting configuration information to terminal devices, such as the vehicle device 120 (V-device). The vehicle devices 120 transmit (block 301) V2X signalling via wireless communications. A network apparatus, such as the road side unit 116, measures (block 302) the V2X signalling transmitted from the vehicle devices 120, and, based on the measuring 302, obtains (block 302) the status of road traffic in the proximity of the road side unit 116. If a pre-defined triggering event is detected in the status of the road traffic in the proximity of the road side unit 116, the road side unit 116 selects (block 303) at least one road side unit operation mode for V2X communication based on the status of the road traffic, and sets (block 303) the operation mode of the road side unit 116 to correspond to the at least one selected road side unit operation mode. The road side unit 116 may transmit (block 304) to the vehicle device 120 via a wireless communication link, control signalling indicating the at least one selected road side unit operation mode for the V2X communication. Additionally/alternatively, the road side unit 116 may indicate (block 305), to the serving network node 110, the at least one selected operation mode for the V2X communication, wherein the serving network node 110 may transmit (not shown in FIG. 3), to the road side unit 116, a confirmation of receipt of the selected operation mode. The confirmation may also include some modification/reconfiguration for the selected operation mode, as determined by the serving network node 110. The vehicle device 120 may receive (block 306), via the wireless communication link, the control signalling indicating the at least one selected road side unit operation mode for the V2X communication, and, based on the receiving 306, use (block 306) the at least one selected operation mode for the V2X communication.

In an embodiment, RSU 116 of the UE-type communicates over a PC5 interface with the vehicle device 120, and RSU 116 of the eNB-type communicates over an Uu interface with the vehicle device 120.

In an embodiment, the RSU operation mode indication is transmitted from the serving network node(s) 110 to the vehicle device(s) 120 (instead of or in addition to the RSU operation mode indication being transmitted 207, 304 from the road side unit(s) 116 to the vehicle device(s) 120).

An embodiment relates to vehicular communications referred to as V2X in 3GPP LTE Rel-14 and beyond. An embodiment further relates to SON-based adaptation of RSU modes on-the-fly, depending on e.g. dynamic and time-varying road traffic scenarios, vehicle device states/conditions, etc.

In an embodiment, self-reconfigurable multi-mode RSUs are capable of operating in at least one of the following modes at a given time: UE-type RSU, eNB-type RSU, small-cell eNB, and any feasible combinations thereof (such as {UE-type RSU+small-cell eNB}; {eNB-type RSU+small-cell eNB}; {UE-type RSU+eNB-type RSU}; {UE-type RSU+eNB-type RSU+small-cell eNB}) to be operated simultaneously. Each mode may be targeted and used for a certain group of UEs or services. The self-configurable multi-mode RSUs are to support V2X. A serving network is to configure and control the adaptive operation modes of RSUs as well as corresponding vehicle device behaviour on-the-fly for an efficient support of V2X in highly dynamic and time-varying road traffic scenarios.

In an embodiment, fast and reliable V2X communications are provided for further evolution of LTE-A as well as 5G. There is a wide range of applications and services with different characteristics and requirements associated with V2X. These include road safety related applications and also delegating full driving or handling of vehicles to the vehicles themselves, at least from time to time, which is somewhat similar to an autopilot functionality. There is a need to facilitate and ensure a free flow of data, mostly in real-time with different levels or classes of traffic load and traffic priority, for vehicular communications between, e.g. an individual vehicle and other vehicles or roadside units (RSU) within a specified proximity range, and an authenticated and authorized UE device of an individual vehicle and a serving RAN.

V2X communications may involve requirements on latency and reliability as well as on mobility support (for example, as low as 20 ms end-to-end delay, almost 0 error, and up to a maximum speed of 280 km/h). Different types of vehicle devices with or without regular cellular access capability or SIM may have to be supported. A multi-service support may be required, with various end-user and network services and applications ranging from road safety and transportation efficiency for vehicles on the road to information and entertainment for users aboard. Multi-tenancy or multi-operator supports may be required, in which not only the end-user devices may subscribe or register to different operators, but also deployed roadside infrastructure and spectrum resources are shared among different tenders or operators. Security services and other advanced networking services are to ensure adequate authentication and authorization of vehicle devices as well as reliability of information flows and contents.

In an embodiment, a SON-based mechanism is utilized to configure and control multi-mode RSUs as well as relevant vehicular UE devices on-the-fly for an efficient support of V2X communications. Examples for adaptive RSU mode control include: the UE-type RSU for highways or freeways in normal traffic conditions, for rural areas with less road traffic, or for sub-urban or urban roads during night time; the eNB-type RSU where high multiplexing capacity is needed and there is sufficient capacity in RAN to provide regular MBB (mobile broadband) cellular access; the eNB-type RSU combined with a small-cell eNB in rush hours or congestion when road traffic is travelling slowly or standing still on the roads for a long enough time. The configuration and control of the multi-mode RSUs may be initiated by a controlling network or individual RSUs based on a following measurement and reporting procedure.

RSUs may be configured to measure and report designated V2X-related traffic statuses to a controlling node which may be a serving macro cell base station or a network server, individually as well as cooperatively (cooperative measurement and/or reporting together with targeted co-deployed RSUs along relevant roads). The triggers as well as the V2X-related traffic statuses for the reporting, may include: e.g. sudden changes in V2V traffic or traffic variations exceeding preconfigured limits; potential congestion matching some pre-configured or self-learnt traffic patterns. Further examples for monitoring and triggering the measurement and reporting at RSU include the following. For example, RSU may detect the same vehicle device(s) for longer than an expected time interval (an estimated threshold may be set depending on a regular road-speed limit and RSU radio range). In another example, RSU may detect more than an expected average number of different V2V devices or cars within its proximity over a certain sliding time window (here simple and quick massive discovery may be applied, based e.g. on monitoring and measuring total received power on a preconfigured physical reference signal sent by each individual V2V device or car in a certain condition, or monitoring the congestion/collisions on a radio interface). In yet another example, cooperative measurement and reporting may be applied to avoid false alarms due to e.g. regular traffic control events such as vehicles temporarily waiting for red light, train passing, or giving way for public safety or on-duty vehicles within a set or predictable time limit (for example, the reporting may be triggered by a given RSU, if an Nth RSU in front of or behind the given RSU is experiencing the same situation; this implies a need for some inter-RSU interaction between at least 2 identified RSUs, as configured).

RSUs may be configured and controlled by the controlling node using explicit signalling to reconfigure the operation modes of the individual RSUs on-the-fly, based on the received V2X-related traffic status reports as well as the cellular-access traffic load statuses the macro cell is experiencing. This tight network-initiated reconfiguration may be used for urban, less predictable, or frequently congested areas where the eNB-type RSU or the combined {eNB-type RSU+small-cell eNB} is more suitable during day time or in busy roads, and either the eNB-type RSU or UE-type RSU is more suitable during night time, depending on the measured V2X-related traffic statuses.

RSUs may be configured and controlled to determine and reconfigure the suitable operation modes themselves, either individually or cooperatively depending on pre-configured information (a more static or predictable road and location-specific traffic patterns during the rush hours, night time, midday time, traffic light control, etc.) and based on the measured statuses or conditions. This RSU-initiated or determined reconfiguration may be used for RSUs deployed on freeways or highways, rural areas, etc., where the UE-type RSU operation mode is likely to be sufficient for the most of the time. The eNB-type RSU mode or the combination with eNB is applicable around traffic light cross sections or when some unexpected event causes the traffic to slow down or congestion occurs.

If RSU is configured to operate in the combined operation mode with at least both the UE-type RSU and the eNB-type RSU, RSU may be configured and controlled to serve different vehicle devices by using either the UE-type mode or the eNB-type mode or both. To facilitate the vehicle devices to select the right RSU mode for its V2X services, RSU or its serving macro eNB may be configured to indicate the multi-mode RSU and also RSU mode selection rules to the vehicle device. For instance, it may be indicated that an idle-mode vehicle device or DRX-mode vehicle device may select the UE-type RSU mode to use the PC5 interface with autonomous resource allocation for the V2X communications, and a connected-mode vehicle device may select the eNB-type RSU mode or both modes to use the Uu interface and an optional PC5 interface with scheduled resource allocation. The multi-mode operation may be enabled by operating the PC5 and Uu (UL) interfaces on different frequency bands, e.g. PC5 on 5.9 GHz, and Uu on 2 GHz. The multi-mode RSU may also be visible to the V2X application to enable a procedure in which different V2X services/applications (assuming the different V2X services may have different reliability and latency requirements) may determine if the vehicle device may stay in the idle or connected state to use a different RSU mode for the V2X communication. Or the network, based on cell load, vehicle density and/or vehicle use cases that each vehicle device is using, dynamically configures the vehicle device to use either the UE-type RSU mode or the eNB-type RSU mode or both.

The on-the-fly configuration and control of RSUs between the controlling node and RSUs may be based either on network-interface signalling (e.g. X2 or S1 interface signalling as in LTE and LTE-A) or over-the-air signalling via the serving macro eNB, for example.

In an embodiment, the above procedure may be applied to possible dynamic transitions from one optimized RSU operation mode to another, back and forth. Thus each optimized RSU operation mode may be associated with e.g. an upper-bound threshold and a lower-bound threshold (in terms of the V2X road traffic load, macro-coverage traffic load, etc.); the minimum lifetime of an individual corresponding mode; measurement time interval(s) each of which may be self-reconfigurable or adaptive constraints depending on the deployment scenarios, services, preconfigured cooperative schemes between the co-deployed and co-located RSUs. The latter refers to cases in which, for example, a subset of RSUs, one or more co-deployed and co-located RSUs, may be configured to determine or controlled to adapt their operation mode individually and independently or dependently on one another.

RSU may be configured to advertise or indicate the current operation mode and an upcoming operation mode change towards the vehicle devices, if such a transition or modification is determined.

RSUs and controlling macro networks take into account service continuity or minimized service interruption perspectives when changing the operation mode of RSUs which are used, or about to be used, for providing remote network access services to the vehicle devices. For instance, RSU may be allowed to remain operating in the current operation mode for an extended period of time until the last vehicle device which is being served by RSU leaves the RSU coverage. During a transition period, RSU may be configured not to admit a new user device, at least one which needs a mobility connection.

Figure 4:
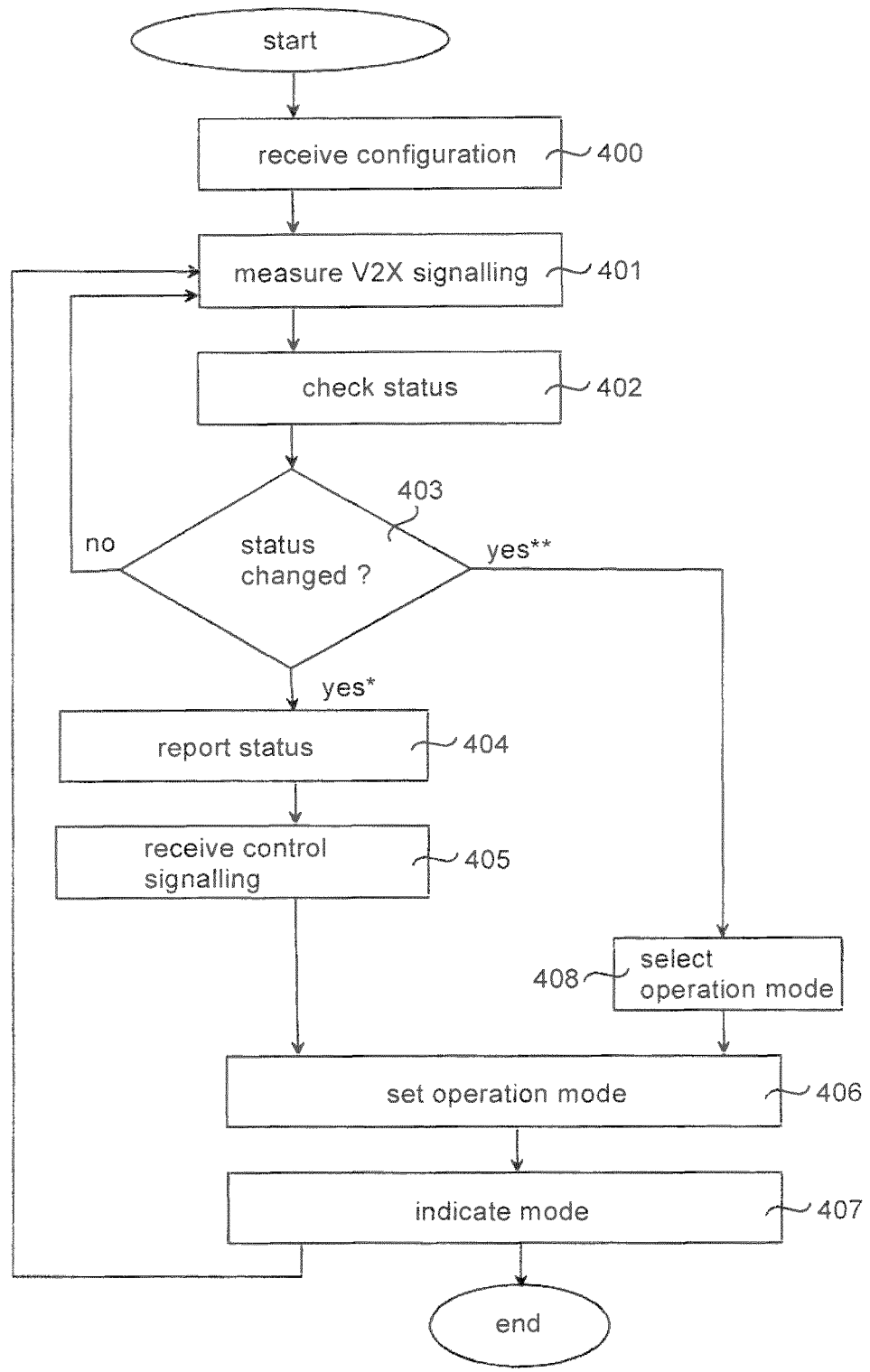
FIG. 4 illustrates a process for selecting an RSU operation mode according to an embodiment of the invention.

Referring to FIG. 4, the road side unit 116 may receive (block 400), from the serving network node 110, designated V2X-related measuring and reporting configuration information to configure the road side unit 116 to measure and report designated V2X-related traffic statuses to the serving network node 110 individually and/or cooperatively. The he road side unit 116 may measure (block 401) V2X signalling transmitted from the vehicle devices 120, and, based on the measuring 401, obtain and check (block 402) the status of road traffic in the proximity of the road side unit 116.

In option *, if a pre-defined triggering event is detected (block 403) in the status of the road traffic in the proximity of the road side unit 116, the road side unit 116 transmits (block 404) to the serving network node 110, a status report in order to report the obtained road traffic status to the serving network node 110. The road side unit 116 receives (block 405), from the serving network node 110, control signalling indicating at least one selected road side unit operation mode for V2X communication, and based on the receiving 405, sets (block 406) the operation mode of the road side unit 116 to correspond to the at least one selected road side unit operation mode. The road side unit 116 may transmit (block 407) to the vehicle device 120, via a wireless communication link, control signalling indicating the at least one selected road side unit operation mode for the V2X communication.

In option **, if a pre-defined triggering event is detected (block 403) in the status of the road traffic in the proximity of the road side unit 116, the road side unit 116 selects (block 408), based on the status of the road traffic, at least one road side unit operation mode for the V2X communication. Based on the selecting 408, the road side unit 116 sets (block 406) the operation mode of the road side unit 116 to correspond to the at least one selected road side unit operation mode. The road side unit 116 may transmit (block 407) to the vehicle device 120, via the wireless communication link, control signalling indicating the at least one selected road side unit operation mode for the V2X communication. Additionally/alternatively, the road side unit 116 may indicate (block 407), to the serving network node 110, the at least one selected operation mode for the V2X communication, wherein a confirmation of receipt of the selected operation mode may be received (not shown in FIG. 4) from the serving network node 110.

If the measuring does not indicate (block 403) a pre-defined triggering event in the status of the road traffic in the proximity of the road side unit 116, the road side unit 116 may continue measuring (block 401) the V2X signalling transmitted from the vehicle device 120 and maintain its current operation mode for the V2X communication, until a pre-defined triggering event is detected.

Figure 5:
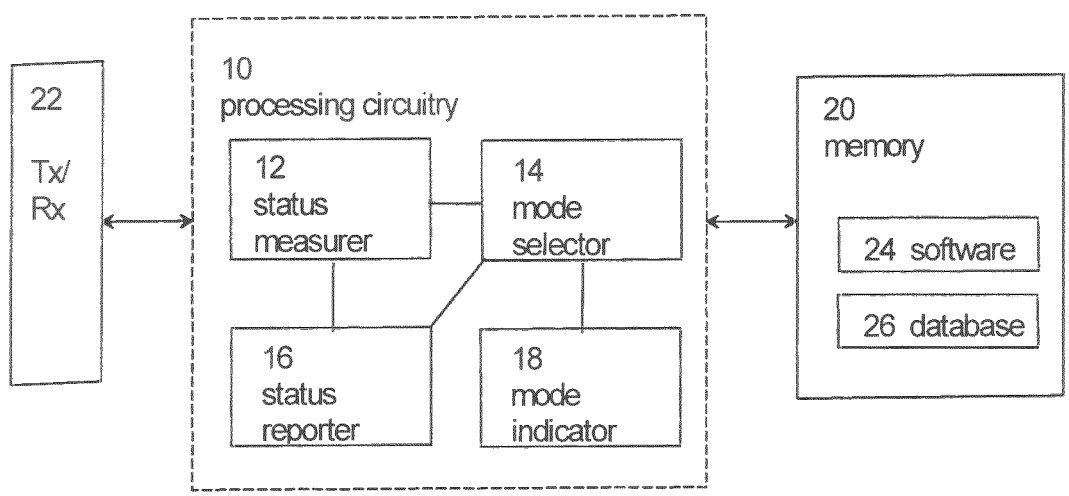
FIG. 5 illustrates a blocks diagram of an apparatus according to an embodiment of the invention.

An embodiment provides an apparatus comprising at least one processor and at least one memory including a computer program code, wherein the at least one memory and the computer program code are configured, with the at least one processor, to cause the apparatus to carry out the procedures of the above-described network element or network node. The at least one processor, the at least one memory, and the computer program code may thus be considered as an embodiment of means for executing the above-described procedures of the network element or the network node, such as a road side unit. FIG. 5 illustrates a block diagram of a structure of such an apparatus. The apparatus may be comprised in the network element or in the network node, e.g. the apparatus may form a chipset or a circuitry in the network element or in the network node. In some embodiments, the apparatus is the network element or the network node. The apparatus comprises a processing circuitry 10 comprising the at least one processor. The processing circuitry 10 may comprise a status measurer 12 configured to measure signalling transmitted from vehicle devices, and, based on the measuring, obtain the status of road traffic in the proximity of the road side unit. The processing circuitry 10 may comprise a status reporter 16 configured to, if a pre-defined triggering event is detected in the status of the road traffic in the proximity of the road side unit, transmit to a serving network node, a status report in order to report the obtained road traffic status to the serving network node. The processing circuitry 10 may comprise a mode selector 14 configured to set the operation mode of the road side unit to correspond to at least one selected road side unit operation mode for communication. The processing circuitry 10 may further comprise a mode indicator 18 configured to indicate, to the vehicle device (and/or to the serving network node), the at least one selected road side unit operation mode for the communication.

The processing circuitry 10 may comprise the circuitries 12, 14, 16 and 18 as sub-circuitries, or they may be considered as computer program modules executed by the same physical processing circuitry. The memory 20 may store one or more computer program products 24 comprising program instructions that specify the operation of the circuitries 12 to 18. The memory 20 may further store a database 26 comprising definitions for the RSU operation modes, for example. The apparatus may further comprise a radio interface 22 providing the apparatus with radio communication capability with the vehicle devices. The radio interface may comprise a radio communication circuitry enabling wireless communications and comprise a radio frequency signal processing circuitry and a baseband signal processing circuitry. The baseband signal processing circuitry may be configured to carry out the functions of a transmitter and/or a receiver. In some embodiments, the radio interface may be connected to a remote radio head comprising at least an antenna and, in some embodiments, radio frequency signal processing in a remote location with respect to the base station. In such embodiments, the radio interface may carry out only some of radio frequency signal processing or no radio frequency signal processing at all. The connection between the radio interface and the remote radio head may be an analogue connection or a digital connection. In some embodiments, the radio interface may comprise a fixed communication circuitry enabling wired communications.

As used in this application, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described above in connection with FIGS. 1 to 5 may also be carried out in the form of one or more computer process defined by one or more computer programs. The computer program shall be considered to encompass also a module of a computer programs, e.g. the above-described processes may be carried out as a program module of a larger algorithm or a computer process. The computer program(s) may be in source code form, object code form, or in some intermediate form, and it may be stored in a carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to cellular or mobile communication systems defined above but also to other suitable communication systems. The protocols used, the specifications of cellular communication systems, their network elements, and terminal devices develop rapidly. Such development may require extra changes to the described embodiments. Therefore, all words and expressions should be interpreted broadly and they are intended to illustrate, not to restrict, the embodiment.

It will be obvious to a person skilled in the art that, as the technology advances, the inventive concept can be implemented in various ways. The invention and its embodiments are not limited to the examples described above but may vary within the scope of the claims.

List of Abbreviations

D2D device-to-device
SA scheduling assignment
V2V vehicle-to-vehicle
V2I vehicle-to-infrastructure
V2N vehicle-to-network
V2X V2V+V2I+V2N, vehicle-to-X, "vehicle-to-everything"
SON self-organized network
UE user equipment
eNB base station, enhanced node-B

The invention claimed is:

1. A method comprising
measuring, in a road side unit, signalling transmitted from vehicle devices, to obtain a status of road traffic in proximity of the road side unit;
in response to a pre-defined triggering event being detected in the obtained status of the road traffic in the proximity of the road side unit, the method comprises
selecting at least one road side unit operation mode for communication, based on the obtained status of the road traffic, wherein the at least one selected road side unit operation mode for the communication comprises one or a combination of the following modes: a user-equipment-type operational mode, a base station-type operational mode, or a small-cell base station operational mode; and
setting, in the road side unit, an operation mode of the road side unit to correspond to the at least one selected road side unit operation mode for the communication.

2. A method according to claim 1, further comprising the road side unit communicating with a serving network node, and, based on the setting, transmitting, from the road side unit to the serving network node, control signalling indicating the at least one selected road side unit operation mode for the communication.

3. A method according to claim 1, wherein the method comprises, based on the setting, transmitting, from the road side unit to the vehicle device via a wireless communication link, control signalling indicating the at least one selected road side unit operation mode for the communication.

4. A method according to claim 1, wherein the at least one selected road side unit operation mode for the communication is service-specific or vehicle-device-group-specific.

5. A method according to claim 1, wherein the method comprises one or more of the following:
selecting the user-equipment-type operation mode for highways or freeways in normal traffic conditions, for rural areas with less road traffic, and for sub-urban or urban roads during night time;
selecting the base-station-type operation mode when high multiplexing capacity is needed and in response to it being possible to provide mobile broadband cellular access; or
selecting the base-station-type operation mode combined with a small cell base station mode during rush hours or congestion when road traffic is travelling slowly or standing still.

6. A method according to claim 1, wherein the pre-defined triggering event in the status of the road traffic comprises one or more of the following: a change in vehicle device road traffic, vehicle device road traffic variations exceeding a preconfigured limit, congestion matching a pre-configured or self-learnt vehicle device road traffic pattern, detecting the same vehicle device in the proximity of the road side unit for longer than expected, or detecting more than an expected average number of vehicle devices within the proximity of the road side unit over a specific time window.

7. A method according to claim 1, further comprising the road side unit communicating with a serving network node, and wherein the at least one selected road side unit operation mode for communication is further selected based on cellular access network load experienced in the serving network node.

8. A method according to claim 1, wherein the method comprises selecting multiple operation modes to be used simultaneously for the at least one selected road side unit operation mode.

9. A method according to claim 1, wherein the method comprises indicating multi-mode selection rules, such that
an idle-mode or DRX-mode vehicle device is to use the user-equipment-type operation mode via a PC5 interface with autonomous resource allocation, for the communication; and/or
a connected-mode vehicle device is to use the base-station-type operation mode via a Uu interface, or both the base-station-type and user-equipment-type operation mode via the Uu interface and the PC5 interface, with scheduled resource allocation, for the communication.

10. A method according to claim 1, wherein the method comprises selecting operation modes of co-deployed and/or co-located road side units independently or dependently on one another.

11. A method according to claim 1, wherein the method comprises maintaining a current operation mode for the road side unit for an extended period of time to avoid service interruption.

12. A method according to claim 1, further comprising the road side unit communicating with a serving network node, and wherein the serving network node comprises a macro cell base station or a network server.

13. A method according to claim 1, wherein selecting the at least one road side unit operation mode for communication comprises:
  transmitting, from the road side unit to a serving network node, a status report in order to report the obtained road traffic status to the serving network node; and
  receiving, in the road side unit from the serving network node, control signalling indicating the at least one selected road side unit operation mode for the communication.

14. An apparatus comprising
at least one processor; and
at least one memory including a computer program code, wherein the at least one memory and the computer program code are configured, with the at least one processor, to cause the apparatus to
measure signalling transmitted from vehicle devices, to obtain the status of road traffic in the proximity of a road side unit;
in response to a pre-defined triggering event being detected in the obtained status of the road traffic in the proximity of the road side unit, the at least one memory and the computer program code are configured, with the at least one processor, to cause the apparatus to:
select at least one road side unit operation mode for communication, based on the obtained status of the road traffic, wherein the at least one selected road side unit operation mode for the communication comprises one or a combination of the following modes: a user-equipment-type operational mode, a base station-type operational mode, or a small-cell base station operational mode; and
set an operation mode of the road side unit to correspond to the at least one selected road side unit operation mode for the communication.

15. An apparatus according to claim 14, wherein the at least one memory and the computer program code are configured, with the at least one processor, to cause the apparatus, when selecting the at least one road side unit operation mode for communication, to:
  transmit, from the road side unit to a serving network node, a status report in order to report the obtained road traffic status to the serving network node; and
  receive, in the road side unit from the serving network node, control signalling indicating the at least one selected road side unit operation mode for the communication.

16. An apparatus according to claim 14, wherein the at least one memory and the computer program code are configured, with the at least one processor, to cause the apparatus to: communicate by the road side unit with a serving network node, and, based on the setting, transmitting, from the road side unit to the serving network node, control signalling indicating the at least one selected road side unit operation mode for the communication.

17. An apparatus according to claim 14, wherein the at least one memory and the computer program code are configured, with the at least one processor, to cause the apparatus to: transmit, based on the setting, from the road side unit to the vehicle device via a wireless communication link, control signalling indicating the at least one selected road side unit operation mode for the communication.

18. An apparatus according to claim 14, wherein the pre-defined triggering event in the status of the road traffic comprises one or more of the following: a change in vehicle device road traffic, vehicle device road traffic variations exceeding a preconfigured limit, congestion matching a pre-configured or self-learnt vehicle device road traffic pattern, detecting the same vehicle device in the proximity of the road side unit for longer than expected, or detecting more than an expected average number of vehicle devices within the proximity of the road side unit over a specific time window.

19. An apparatus according to claim 14, wherein the at least one memory and the computer program code are configured, with the at least one processor, to cause the apparatus to: select multiple operation modes to be used simultaneously for the at least one selected road side unit operation mode.

20. A computer program product embodied on a non-transitory distribution medium readable by a computer and comprising program instructions which, when loaded into the computer, execute a computer process that cause the computer to perform at least the following:
  measuring, in a road side unit, signalling transmitted from vehicle devices, to obtain a status of road traffic in proximity of the road side unit;
  in response to a pre-defined triggering event being detected in the obtained status of the road traffic in the proximity of the road side unit, performing operations comprising:
  selecting at least one road side unit operation mode for communication, based on the obtained status of the road traffic, wherein the at least one selected road side unit operation mode for the communication comprises one or a combination of the following modes: a user-equipment-type operational mode, a base station-type operational mode, or a small-cell base station operational mode; and
  setting, in the road side unit, an operation mode of the road side unit to correspond to the at least one selected road side unit operation mode for the communication.

* * * * *